No. 682,515. Patented Sept. 10, 1901.
E. ALLARD.
MOLDING AND FRYING IMPLEMENT.
(Application filed June 4, 1901.)
(No Model.)

Witnesses
S. Brashears
M. C. Lyddane.

Inventor
Eugene Allard
pr. G. Dittman
Atty

UNITED STATES PATENT OFFICE.

EUGÈNE ALLARD, OF CANNES, FRANCE.

MOLDING AND FRYING IMPLEMENT.

SPECIFICATION forming part of Letters Patent No. 682,515, dated September 10, 1901.

Application filed June 4, 1901. Serial No. 63,138. (No model.)

*To all whom it may concern:*

Be it known that I, EUGÈNE ALLARD, a citizen of the French Republic, residing at Cannes, France, have invented certain new and useful Improvements in Molding and Frying Implements; and I do hereby declare the following to be a full, clear, and exact description of the invention, such as will enable others skilled in the art to which it appertains to make and use the same.

The present invention has for its object to provide an implement designed to give to pasty or piece-cut food a hollow shape and to contain the food thus shaped while being dried or fried.

This implement is to be utilized for producing different shapes, such as vases of all kinds, flower-baskets, bowls, boats, bird-nests, &c., with potatoes, office-paste, or sweet dough.

It consists of two wire-gauze parts of any suitable shape, which are strengthened by a structure made of strong wire, the one part fitting into the other and both being secured together by suitable means, such as sliding rings, leaving between them a free space into which the sweet paste to be fried or dried is to be pressed. This paste may be dipped into boiling fat and fried to the desired degree, the implement retaining the food in its desired shape and preventing the swelling up of the paste, and the operation may be completed without having to take the mold out of the hot grease.

The annexed drawings represent, as an example of my invention, a mold having the form of a basket.

Figure 1:
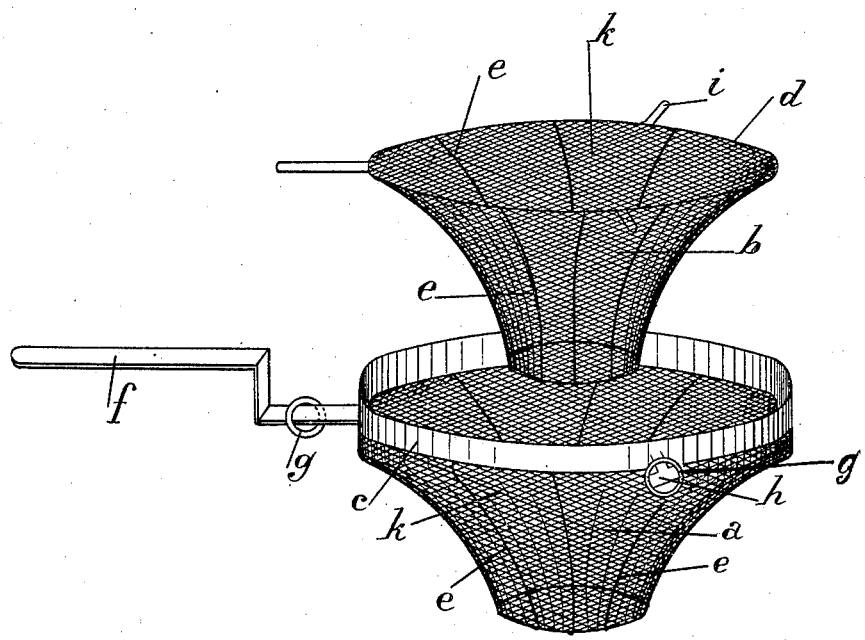
Figure 2:
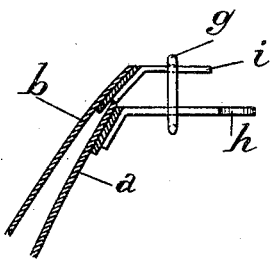
Figure 3:
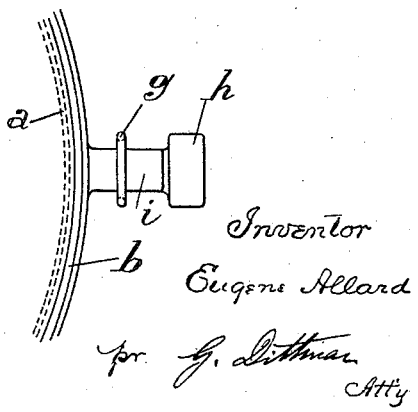

Figure 1 is a perspective view of both parts of the mold separated from each other. Figs. 2 and 3 are fragmentary views illustrating the details of construction of the rings which are employed for fixing the inner part in the outer one.

$a$ is the outer part. $b$ is the inner part. The upper edges are formed with rigid rims $c$ and $d$, made of thick wire or tin-plate bands, which form together the structure of both parts of the mold.

The parts $a$ and $b$ are made preferably of wire-gauze $k$, having meshes of any suitable dimensions, so that two parts are formed, the inner one of which has the inner shape of the object to be molded, while the outer one has the outer shape of this same object. The part $a$ is provided with a suitable handle, such as $f$, and sliding rings $g$ may be used to hold the two parts together, the rings having a wide range of play on nosepieces $h$ and $i$, fixed to the rims of the mold.

These molds are very simple in construction and very cheap and allow of any shapes or forms to be made pleasing to the sight and shaped to the cook's taste. Potatoes cut in thin slices, as well as nougat and fine pastes, may thus find a new use, form new dishes, and be served in an unlimited variety of forms.

Having thus fully described my invention, what I claim as new, and desire to secure by Letters Patent of the United States, is—

The herein-described cooking-mold, comprising an inner and an outer part, each composed of a metallic frame covered with wire-mesh and a suitable strengthening-ring, at the top, a suitable handle secured to the outer part, nosepieces projecting from the two parts, and sliding rings fitting on said nosepieces for securing the two parts together in operative positions, substantially as described.

In testimony whereof I affix my signature in presence of two witnesses.

EUGÈNE ALLARD.

Witnesses:
 ALFRED BAUDART,
 EUGENE HAUNNE.